No. 686,466. Patented Nov, 12, 1901.
A. F. MARTINS.
MECHANICAL STAGE FOR MICROSCOPES.
(Application filed June 26, 1901.)
(No Model.)
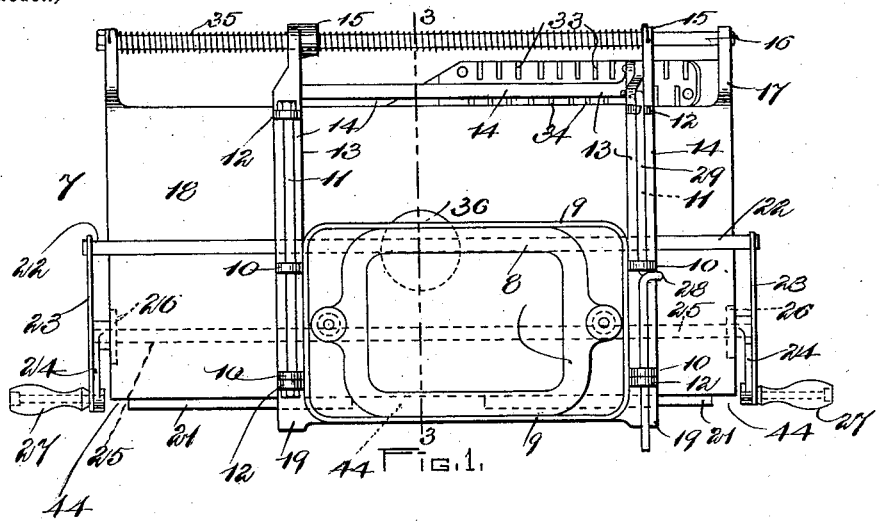
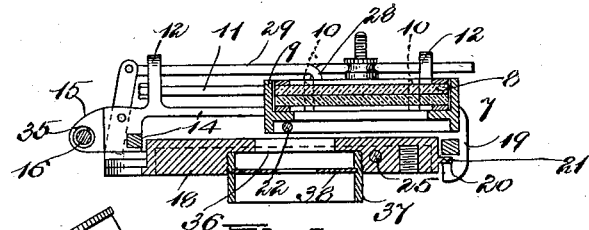
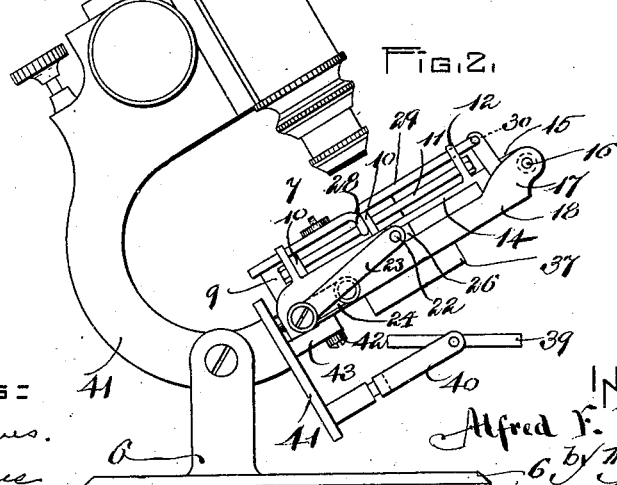
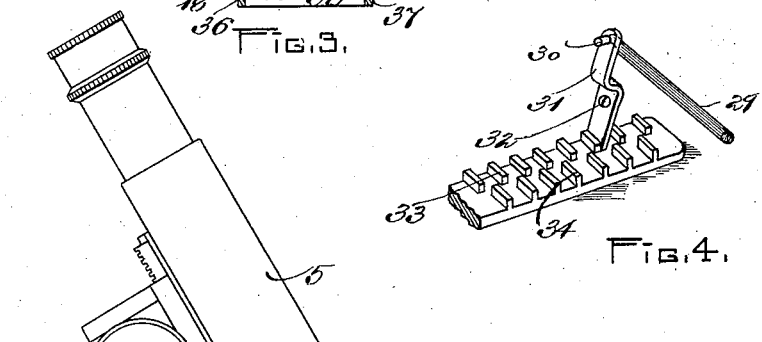
WITNESSES: INVENTOR:
Alfred F. Martins

UNITED STATES PATENT OFFICE.

ALFRED F. MARTINS, OF BOSTON, MASSACHUSETTS.

MECHANICAL STAGE FOR MICROSCOPES.

SPECIFICATION forming part of Letters Patent No. 686,466, dated November 12, 1901.

Application filed June 26, 1901. Serial No. 66,047. (No model.)

*To all whom it may concern:*

Be it known that I, ALFRED F. MARTINS, a citizen of the United States, residing at Boston, in the county of Suffolk and State of Massachusetts, have invented new and useful Improvements in Mechanical Stages for Microscopes, of which the following is a specification.

The object of this invention is to produce a stage for microscopes operated by mechanical means in such a manner that all portions of the object under inspection shall be brought within the line of vision of the microscope.

The invention consists in a holder for the object to be inspected, mechanism whereby a lateral movement is imparted to said holder, and mechanism actuated by the lateral movement of said holder to impart a longitudinal movement to said holder.

The invention again consists in a holder for the object to be examined and mechanism to impart a reciprocatory lateral movement and an intermittent longitudinal movement thereto and means whereby when said holder is started upon the movements hereinbefore set forth the entire surface of the object held thereby is carried within the line of vision before said holder can be returned to the point of beginning.

The invention further consists in the combination and arrangement of parts set forth in the following specification, and particularly pointed out in the claims thereof.

Referring to the drawings, Figure 1 is a plan view of my improved mechanical stage for microscopes. Fig. 2 is a side elevation of the same, taken from the right-hand side of Fig. 1 and showing the stage, microscope, and supporting-frame, together with the reflecting-mirror, in position for use. Fig. 3 is a sectional elevation taken on line 3 3, Fig. 1, looking toward the right in said figure. Fig. 4 is a detail perspective of the two racks by which intermittent longitudinal movement is imparted to one of the sliding frames, together with the rocking lever which engages said racks and a portion of the reciprocatory rod by which a rocking motion is imparted to said rocking lever.

In the drawings, 5 is a microscope of well-known construction. 6 is a frame to which said microscope is pivoted.

7 is the "stage" as a whole and comprises a holder 8 for the object to be inspected. Said holder is fastened to a laterally-sliding frame 9, having ears 10 10, which engage parallel rods 11 11, fast to ears 12 12 upon a pivoted longitudinally-sliding frame 13 13. Said pivoted frame consists of four bars 14 14 and has two ears 15 15 thereon, which are pivoted to a rod 16, rigidly fastened to ears 17 17 upon the lower supporting-frame 18. Upon the opposite side of the frame 13 to that at which said frame is pivoted are two lugs 19, slotted at 20 and guided by the two guides 21 21 on the supporting-frame 18. Said guides enter said slots 20.

A rod 22, fast to the laterally-sliding frame 9, is connected at each end thereof by a link 23 to a crank 24, fast to a shaft 25, which rotates in bearings 26 on the supporting-frame 18. Handles 27 are attached to the cranks 24, by means of which said cranks and the shaft 25 are rotated. When the cranks 24 are rotated, the sliding frame 9 is given a reciprocatory movement, carrying said frame backward and forward across the pivoted longitudinally-sliding frame 13 by the links 23, the ears 10 sliding on the rods 11. At each end of the lateral reciprocatory movement of said sliding frame 9 one of the ears 10 strikes a lug 28, formed upon a reciprocatory sliding rod 29. Said rod 29 slides in bearings in the ears 12 and is bent at right angles to its length at 30 to engage a lever 31, pivoted at 32 to the intermittent longitudinally-sliding frame 13, and as said rod is reciprocated in its bearings it tips the lever 31 alternately upon its pivot 32 to one side and the other of a vertical plane passing through said pivot. The lower end of said lever as it is rocked upon its pivot alternately engages the teeth of the two racks 33 34, fast to the supporting-frame 18, the teeth of each rack being opposite the spaces in the other rack. A tension spiral spring 35 is joined at one end to the frame 18 and at the other end to the frame 13, its tendency being to constantly pull said frame 13 to the left, Fig. 1.

In the center of the supporting-frame 18 is a screw-threaded circular hole 36, in which is secured a tube 37, with a diaphragm 38 therein, having a hole 39 in the center thereof, and this diaphragm may be changed, as desired, for other diaphragms having different-sized holes. Beneath the diaphragm 38 and in line therewith is a concave mirror 39, pivotally supported upon an ear 40 upon the microscope-frame 41, said mirror reflecting rays of light upwardly through the diaphragm and object under inspection to the microscope. A screw 42 fastens the supporting-frame 18 rigidly to an ear 43 upon the microscope-frame 41, so that said microscope-frame 41 and supporting-frame 18 constitute, practically, one frame, which serves to support the microscope, the object under inspection, and the mechanical stage by which the entire surface of said object is brought within the line of vision of said microscope.

The operation of the device as a whole is as follows: Assuming the laterally-sliding frame 9 to be at the extreme right of the supporting-frame 18 and at the front side of said supporting-frame, Fig. 1, then the left-hand side of the object under inspection will be in the line of vision of the microscope. Now, rotating the handles 27 the frame 9 will be reciprocated upon the rods 11 laterally across the frame 18, at each end of its stroke tipping the lever 31 upon its pivot 32, as hereinbefore described. Assuming the lower end of the lever 31 to be in engagement with the rack 33, when the laterally-sliding frame 9 arrives at the extreme of its backward movement, one of the ears 10 will engage the lug 28 upon the reciprocatory sliding rod 29, pushing said rod backwardly, and will tip the lever 31 upon its pivot 32, and the lower end of said lever will pass from engagement with the rack 33 into the space in line therewith between two teeth upon the rack 34, and as soon as the rack 33 is disengaged by the said tipping of the lever 31 the spring 35 will carry the longitudinally-sliding frame 13, together with the laterally-sliding frame 9, the holder 8, and the object under inspection, forward until said lower end of the lever 31 comes into engagement with the next tooth upon the rack 34, and upon the reversal of the movement of the laterally-sliding frame 9 the lever will be rocked upon its pivot and in the opposite direction thereto, entering a space upon the rack 33, and as the reciprocatory movement of the laterally-sliding frame 9 is continued this rocking motion of the lever 31 will be repeated at each extreme of said laterally-sliding motion of the frame 9, resulting in an intermittent longitudinal motion of the frame 13.

It will be seen that the spring 35 draws the frame 13 toward the left, Fig. 1, and that each of the teeth in the racks 33 and 34 acts as a stop against which the lower end of the lever 31 abuts, and it will be understood that by continuing the rotation of the cranks 24 the holder 8 and the object contained therein will receive a reciprocatory lateral movement and an intermittent longitudinal movement with relation to the supporting-frame 18 until step by step the object under inspection will have passed into the line of vision of the microscope 5. After the frame 13 has moved to the extreme left of the frame 18 and all portions of the object under inspection have been passed within the line of vision of the microscope the said frame 13 is returned to its original position at the right of said supporting-frame by tipping said frame 13 upwardly upon its pivotal rod 16, the lugs 19 passing up through the spaces 44 in the guides 21. The frame 13 is then pushed to the right, Fig. 1, stretching the spring 35, and is then dropped to a horizontal position, the lugs 19 passing into the spaces 44, with the slots 20 therein in line with the guides 21, and the holder, together with another object held thereby, is then in readiness to be passed beneath the microscope by means of the mechanism hereinbefore described.

It will be seen that after the longitudinally-sliding frame 13 has commenced its longitudinal movement upon the frame 18 toward the left, Fig. 1, the slots 20 in the lugs 19 will engage the guides 21 upon the frame 18, and therefore the frame 13 cannot be tipped upon the pivotal shaft 16 until said frame has passed to the extreme left of said frame 18 and the lugs 19 have passed into the spaces 44, disengaging said lugs from the guides 21, and therefore after the object has once been placed beneath the microscope the entire surface of said object will be exposed within the line of vision of said microscope before the frame can be returned to the point of beginning.

Having thus described my invention, what I claim, and desire by Letters Patent to secure, is—

1. A microscope, a frame upon which said microscope is supported, a holder for the object to be inspected, mechanism whereby a lateral movement is imparted to said holder, and mechanism actuated by the lateral movement of said holder to impart a longitudinal movement to said holder.

2. A microscope, a frame upon which said microscope is supported, a holder for the object to be inspected, mechanism whereby a lateral movement is imparted to said holder, and mechanism actuated by said first-named mechanism to impart a longitudinal movement to said holder.

3. A microscope, a frame upon which said microscope is supported, a holder for the object to be inspected, mechanism whereby a lateral movement is imparted to said holder, and mechanism actuated by the lateral movement of said holder to impart an intermittent longitudinal movement to said holder.

4. A microscope, a frame upon which said microscope is supported, a holder for the object to be inspected, mechanism whereby a lateral movement is imparted to said holder, and mechanism actuated by the lateral movement of said holder to impart an intermittent longitudinal movement to said holder at each extreme of its lateral movement.

5. A microscope, a frame upon which said microscope is supported, a sliding frame pivoted to and arranged to slide longitudinally upon said supporting-frame, means whereby said sliding frame is pivoted to said supporting-frame, a second sliding frame arranged to slide laterally upon said longitudinally-sliding frame, and a holder for the object to be inspected fast to said laterally-sliding frame.

6. A microscope, a frame upon which said microscope is supported, a sliding frame arranged to slide longitudinally upon said supporting-frame, a second sliding frame arranged to slide laterally upon said longitudinally-sliding frame, a holder for the object to be inspected fast to said laterally-sliding frame, mechanism to move said longitudinally-sliding frame in one direction, and means to prevent said longitudinally-sliding frame from being moved in the opposite direction before it arrives at a predetermined point, said means consisting of guides upon said supporting-frame arranged to engage slots upon said longitudinally-sliding frame.

7. A microscope, a frame upon which said microscope is supported, a sliding frame pivoted to and arranged to slide longitudinally upon said supporting-frame, means whereby said sliding frame is pivoted to said supporting-frame, a second sliding frame arranged to slide laterally upon said longitudinally-sliding frame, a holder for the object to be inspected fast to said laterally-sliding frame, and means to lock said longitudinally-sliding frame against vertical movement until it arrives at one extreme of its longitudinal movement.

In testimony whereof I have hereunto set my hand in presence of two subscribing witnesses.

ALFRED F. MARTINS.

Witnesses:
CHARLES S. GOODING,
WILLIAM CLAUS.